(12) United States Patent
Zhuang et al.

(10) Patent No.: US 10,686,710 B2
(45) Date of Patent: *Jun. 16, 2020

(54) SYSTEM AND METHOD FOR COMPRESSION AND DECOMPRESSION DEVICES DISCOVERY AND HANDSHAKE

(71) Applicant: APPEX NETWORKS HOLDING LIMITED, Cupertino, CA (US)

(72) Inventors: Hao Zhuang, Sammamish, WA (US); Yongdong Wang, Cupertino, CA (US)

(73) Assignee: APPEX NETWORKS HOLDING LIMITED, Cupertino, CA (US)

( * ) Notice: Subject to any disclaimer, the term of this patent is extended or adjusted under 35 U.S.C. 154(b) by 32 days.

This patent is subject to a terminal disclaimer.

(21) Appl. No.: 16/056,196

(22) Filed: Aug. 6, 2018

(65) Prior Publication Data

US 2018/0343204 A1 Nov. 29, 2018

Related U.S. Application Data

(63) Continuation of application No. 14/593,939, filed on Jan. 9, 2015, now Pat. No. 10,050,888.

(60) Provisional application No. 61/926,158, filed on Jan. 10, 2014.

(51) Int. Cl.
*G06F 15/16* (2006.01)
*H04L 12/815* (2013.01)
*H04L 12/807* (2013.01)
*H04L 12/801* (2013.01)

(52) U.S. Cl.
CPC .......... *H04L 47/22* (2013.01); *H04L 47/193* (2013.01); *H04L 47/27* (2013.01)

(58) Field of Classification Search
None
See application file for complete search history.

(56) References Cited

U.S. PATENT DOCUMENTS

| 5,805,086 | A | * | 9/1998 | Brown | H03M 7/3086 341/50 |
| 7,233,997 | B1 | * | 6/2007 | Leveridge | G06F 21/33 709/217 |
| 2004/0145773 | A1 | | 7/2004 | Oakeson et al. | |
| 2004/0215721 | A1 | | 10/2004 | Szeto et al. | |
| 2004/0250059 | A1 | * | 12/2004 | Ramelson | H04L 63/0428 713/150 |

(Continued)

*Primary Examiner* — Phyllis A Book
(74) *Attorney, Agent, or Firm* — Sheppard Mullin Richter & Hampton LLP (57) ABSTRACT

An apparatus for processing data comprises a memory device storing history data, and at least one processor configured to transmit a first message to a recipient device to initiate a transmission of one or more tokens, acquire a second message, from the recipient device, to confirm that the recipient device is capable of processing the one or more tokens, and responsive to the confirmation, acquire configuration information for generating the one or more tokens. The apparatus is further configured to receive input data, identify one or more data chunks in the history data, locate a part of the input data that is redundant in the history data by searching among the one or more data chunks, generate the one or more tokens reflecting a relationship between the part of the input data and the history data, and transmit the one or more tokens to the recipient device.

20 Claims, 9 Drawing Sheets

(56) References Cited

U.S. PATENT DOCUMENTS

| | | | |
|---|---|---|---|
| 2005/0063377 A1* | 3/2005 | Bryant | H04L 43/18 370/389 |
| 2005/0204148 A1 | 9/2005 | Mayo et al. | |
| 2008/0178271 A1 | 7/2008 | Gajjala et al. | |
| 2010/0281051 A1 | 11/2010 | Sheffi et al. | |
| 2012/0257630 A1 | 10/2012 | Burns | |
| 2012/0331163 A1 | 12/2012 | Bakker | |
| 2013/0114626 A1* | 5/2013 | Bellessort | H04L 69/04 370/477 |
| 2013/0227286 A1* | 8/2013 | Brisson | H04L 63/062 713/168 |
| 2013/0305040 A1 | 11/2013 | Lee et al. | |
| 2013/0318343 A1 | 11/2013 | Bjamason et al. | |
| 2015/0134623 A1* | 5/2015 | Liu | G06F 11/1453 707/692 |
| 2015/0200858 A1 | 7/2015 | Zhuang et al. | |
| 2015/0215436 A1* | 7/2015 | Kancherla | H04L 63/1458 709/219 |

\* cited by examiner

| Chunk ID | Block Signature | Data Offset |
|---|---|---|
| 3003 | 1234 | 0 |
| 3003 | 5678 | 64 |
| 2999 | 1234 | 0 |
| 2999 | 5678 | 64 |

| Chunk ID | Disk Signature |
|---|---|
| 3003 | 3242 |
| 2999 | 2351 |

SYSTEM AND METHOD FOR COMPRESSION AND DECOMPRESSION DEVICES DISCOVERY AND HANDSHAKE

CROSS REFERENCE TO RELATED APPLICATIONS

This application is a continuation of U.S. Non-provisional application Ser. No. 14/593,939, filed Jan. 9, 2015, which claims the benefit of priority to U.S. Provisional Application No. 61/926,158, filed Jan. 10, 2014. The content of all of the above patent applications are hereby incorporated by reference in their entirety.

TECHNICAL FIELD

The present disclosure relates to a technical field of compression and decompression of data, and particular to data containing redundancies.

BACKGROUND

It is common to transfer large volume of data over a computer network, or between storage devices over an I/O (input/output) interface. For example, a user may transfer a whole home directory from a hard drive to a non-volatile memory device (e.g., a flash drive) to perform a periodic backup of the hard drive, or transfer a large document file over the Internet. The data transferred can include redundant data, i.e. data that the recipient already possesses. For example, in the case where the user is creating a periodic backup of the hard drive on the flash drive, the backup data to be transmitted to the flash drive typically contains data that already exists in the flash drive. Similarly, in the case where the user transfers the document file over the Internet, the user may be downloading the file from a network source (e.g., a server), modifying it, and uploading the file back to the network source. If the document file is not completely modified, common data can also exist between the version of the file uploaded and the version of the file downloaded. Transmitting redundant data that is stored in both the source and the destination leads to inefficient utilization of bandwidth of I/O interface and network. Existing compression and decompression methods fail to take advantage of such data redundancies, since locating redundant data over gigabytes to terabytes data storage is generally considered to be time-consuming and with low yield. Hence, there is a need for a technique to search for redundant data with huge volume of data, in an efficient manner and with a high probability of locating the redundancies, which can minimize the transmission of redundant data and can improve the utilization of limited bandwidth of I/O interface and network. Besides, for a device which is capable of using the aforementioned technique to transmit the redundant data over a network, there is also a need for a technique to discover and confirm another device which can recover the redundant data, and to exchange information with that device to facilitate the transmission.

SUMMARY OF THE DISCLOSURE

Additional aspects and advantages of embodiments of present disclosure will be given in part in the following descriptions, become apparent in part from the following descriptions, or be learned from the practice of the embodiments of the present disclosure.

According to some embodiments, an apparatus comprises a memory device that stores history data, and at least one processor configured to transmit a first message to a recipient device to initiate a transmission and reception of the one or more tokens. The apparatus is further configured to acquire a second message, from the recipient device, to confirm that the recipient device is capable of processing and transmitting the one or more tokens; and responsive to a confirmation that the recipient device is capable of processing and transmitting the one or more tokens, acquire configuration information from the recipient device for generating the one or more tokens. The apparatus is further configured to receive input data, identify one or more data chunks in the history data, and locate a part of the input data that is redundant in the history data by searching among the one or more data chunks in the history data. The apparatus is further configured to generate the one or more tokens reflecting a relationship between the part of the input data and the history data. The apparatus is also configured to transmit the one or more tokens to the recipient device.

According to some embodiments, the apparatus is further configured to, responsive to receiving the second message, determine whether resources can be allocated, at the apparatus, for the transmission of the one or more tokens. The apparatus is further configured to, responsive to determining that resources can be allocated at the apparatus, transmit the one or more tokens. According to some embodiments, the first message includes a first indicator configured to indicate that the apparatus is configured to transmit the one or more tokens. In some embodiments, the second message includes a second indicator to indicate that the recipient device is capable of processing the one or more tokens. In some embodiments, the configuration information includes a first identifier configured to uniquely identify the recipient device. In some embodiments, the configuration information includes first information used for generation of one or more second identifiers configured to identify one or more portions of the history data, and the second identifiers are included in the one or more tokens to express the relationship between the one or more tokens and the history data.

According to some embodiments, the first message and the second message are respectively transmitted and received under the Transmission Control Protocol/Internet Protocol (TCP/IP), wherein the first message is a SYN packet, and wherein the second message is a SYN+ACK packet. In some embodiments, the first message includes a TCP header and an IP header, the IP header includes an identification field and the TCP header includes a window field, and the identification field stores a first value and the window field stores a second value, wherein a combination of the first and second values is configured to indicate that the apparatus is configured to transmit and/or process the tokens. In some embodiments, the configuration information is also transmitted as TCP packets.

According to some embodiments, a computer-implemented method for processing data comprises receiving history data from a memory device; and transmitting a first message to a recipient device to initiate a transmission and reception of one or more tokens. The method further comprises acquiring a second message, from the recipient device, to confirm that the recipient device is capable of processing and transmitting the one or more tokens; responsive to confirming that the recipient device is capable of processing and transmitting the one or more tokens, acquiring configuration information from the recipient device for generating the one or more tokens. The method further comprises receiving input data; identifying one or more data chunks in the history data; locating a part of the input data that is redundant in the history data by searching among the one or more data chunks in the history data; generating one or more tokens reflecting a relationship between the part of the input data and the history data; and transmitting the one or more tokens to the recipient device.

BRIEF DESCRIPTION OF THE DRAWINGS

Reference will now be made to the accompanying drawings showing example embodiments of the present application, and in which.

DETAILED DESCRIPTION

Reference will now be made in detail to the embodiments, the examples of which are illustrated in the accompanying drawings. Whenever possible, the same reference numbers will be used throughout the drawings to refer to the same or like parts.

The description of the embodiments is only exemplary, and is not intended to be limiting. The disclosure and claims use reference number "first," "second," and "third" for description purpose. A person having ordinary skill in the art should understand that they do not mean or refer to "the first," "the second," and "the third."

According to some embodiments, the operations, techniques, and/or components described herein can be implemented by an electronic device, which can include one or more special-purpose computing devices. The special-purpose computing devices can be hard-wired to perform the operations, techniques, and/or components described herein, or can include digital electronic devices such as one or more application-specific integrated circuits (ASICs) or field programmable gate arrays (FPGAs) that are persistently programmed to perform the operations, techniques and/or components described herein, or can include one or more hardware processors programmed to perform such features of the present disclosure pursuant to program instructions in firmware, memory, other storage, or a combination. Such special-purpose computing devices can also combine custom hard-wired logic, ASICs, or FPGAs with custom programming to accomplish the technique and other features of the present disclosure. The special-purpose computing devices can be desktop computer systems, portable computer systems, handheld devices, networking devices, or any other device that incorporates hard-wired and/or program logic to implement the techniques and other features of the present disclosure.

The one or more special-purpose computing devices can be generally controlled and coordinated by operating system software, such as iOS, Android, Blackberry, Chrome OS, Windows XP, Windows Vista, Windows 7, Windows 8, Windows Server, Windows CE, Unix, Linux, SunOS, Solaris, VxWorks, or other compatible operating systems. In other embodiments, the computing device can be controlled by a proprietary operating system. Operating systems control and schedule computer processes for execution, perform memory management, provide file system, networking, I/O services, and provide a user interface functionality, such as a graphical user interface ("GUI"), among other things.

Figure 1:
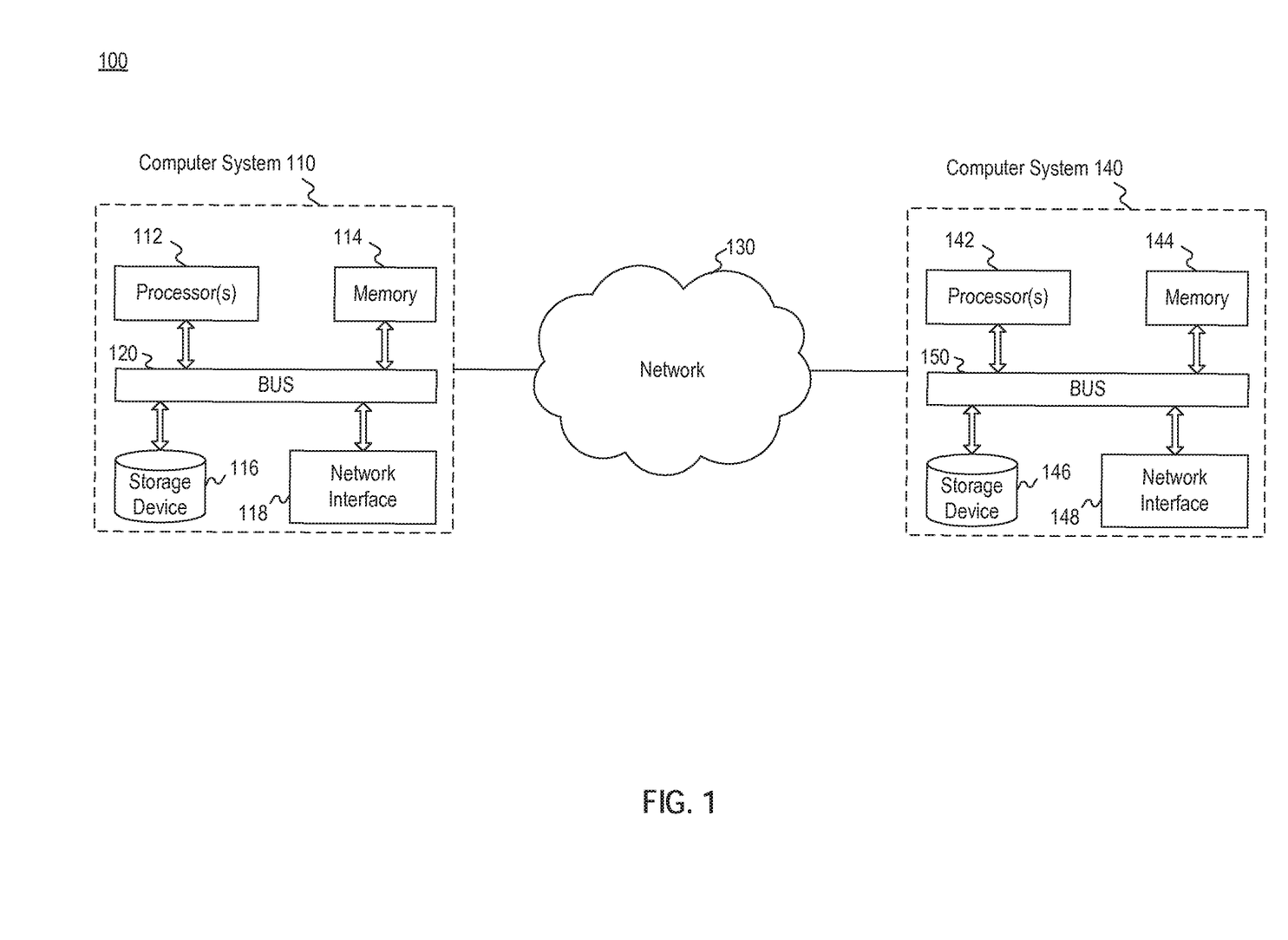
FIG. 1 is a block diagram of an exemplary network system with which embodiments of the present disclosure can be used.

FIG. 1 is a block diagram of an exemplary system 100 with which embodiments described herein can be used. As shown in FIG. 1, system 100 includes a first computer system 110, a network 130, and a second computer system 140. First computer system 110 includes one or more processors 112, a memory device 114, a storage device 116, and a network interface 118, all of which can communicate with each other via a bus 120. Through network 130, first computer system 100 can exchange data with a second computer system 140. Second computer system 140 also includes one or more processors 142, a memory device 144, a storage device 146, and a network interface 148, all of which can communicate with each other via a bus 150.

Both memories 114 and 144 can be a random access memory (RAM) or other volatile storage devices for storing information and instructions to be executed by, respectively, processors 112 and 142. Memories 114 and 144 also can be used for storing temporary variables or other intermediate information during execution of instructions to be executed by processors 112 and 142. Such instructions, after being stored in non-transitory storage media accessible to processors 112 and 114 (e.g., storage devices 116 and 146), render computer systems 110 and 140 into special-purpose machines that are customized to perform the operations specified in the instructions. The instructions can be organized into different software modules, which can include, by way of example, components, such as software components, object-oriented software components, class components and task components, processes, functions, fields, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module can be compiled and linked into an executable program, installed in a dynamic link library, or written in an interpreted programming language such as, for example, BASIC, Perl, or Python. It will be appreciated that software modules can be callable from other modules or from themselves, and/or can be invoked in response to detected events or interrupts. Software modules configured for execution on computing devices can be provided on a computer readable medium, such as a compact disc, digital video disc, flash drive, magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in firmware, such as an EPROM. It will be further appreciated that hardware modules can be comprised of connected logic units, such as gates and flip-flops, and/or can be comprised of programmable units, such as programmable gate arrays or processors. The modules or computing device functionality described herein are preferably implemented as software modules, but can be represented in hardware or firmware. Generally, the modules described herein refer to logical modules that can be combined with other modules or divided into sub-modules despite their physical organization or storage.

Computer systems 110 and 140 can implement the techniques described herein using customized hard-wired logic, one or more ASICs or FPGAs, firmware and/or program logic which in combination with the computer system causes or programs computer systems 110 and 140 to be a special-purpose machine. According to some embodiments, the operations, functionalities, and techniques and other features described herein are performed by computer systems 110 and 140 in response to processors 112 and 142 executing one or more sequences of one or more instructions contained in, respectively, memories 114 and 144. Such instructions can be read into memories 114 and 144 from another storage medium, such as storage devices 116 and 146. Execution of the sequences of instructions contained in memories 114 and 144 cause respectively processors 112 and 142 to perform the process steps described herein. In alternative embodiments, hard-wired circuitry can be used in place of or in combination with software instructions.

The term "non-transitory media" as used herein refers to any non-transitory media for storing data and/or instructions that cause a machine to operate in a specific fashion. Such non-transitory media can comprise non-volatile media and/or volatile media. Non-volatile media can include, for example, optical or magnetic devices, such as storage devices 116 and 146. Volatile media can include dynamic memory, such as memories 114 and 144. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Network interfaces 118 and 148 can provide a two-way data communication coupling to network 130. For example, network interfaces 118 and 148 can be an integrated services digital network (ISDN) card, cable modem, satellite modem, or a modem to provide a data communication connection to a corresponding type of telephone line. As another example, network interfaces 118 and 148 can be a local area network (LAN) card to provide a data communication connection to a compatible LAN. Wireless links can also be implemented. In any such implementation, network interfaces 118 and 148 can send and receive electrical, electromagnetic or optical signals that carry digital data streams representing various types of information, and provide the data stream to storage devices 116 and 146. Processors 112 and 142 can then convert the data into a different form (e.g., by executing software instructions to compress or decompress the data), and then store the converted data into the storage devices (e.g., storage devices 116 and 146), and/or transmit the converted data via network interfaces 118 and 148 over network 130.

Figure 2:
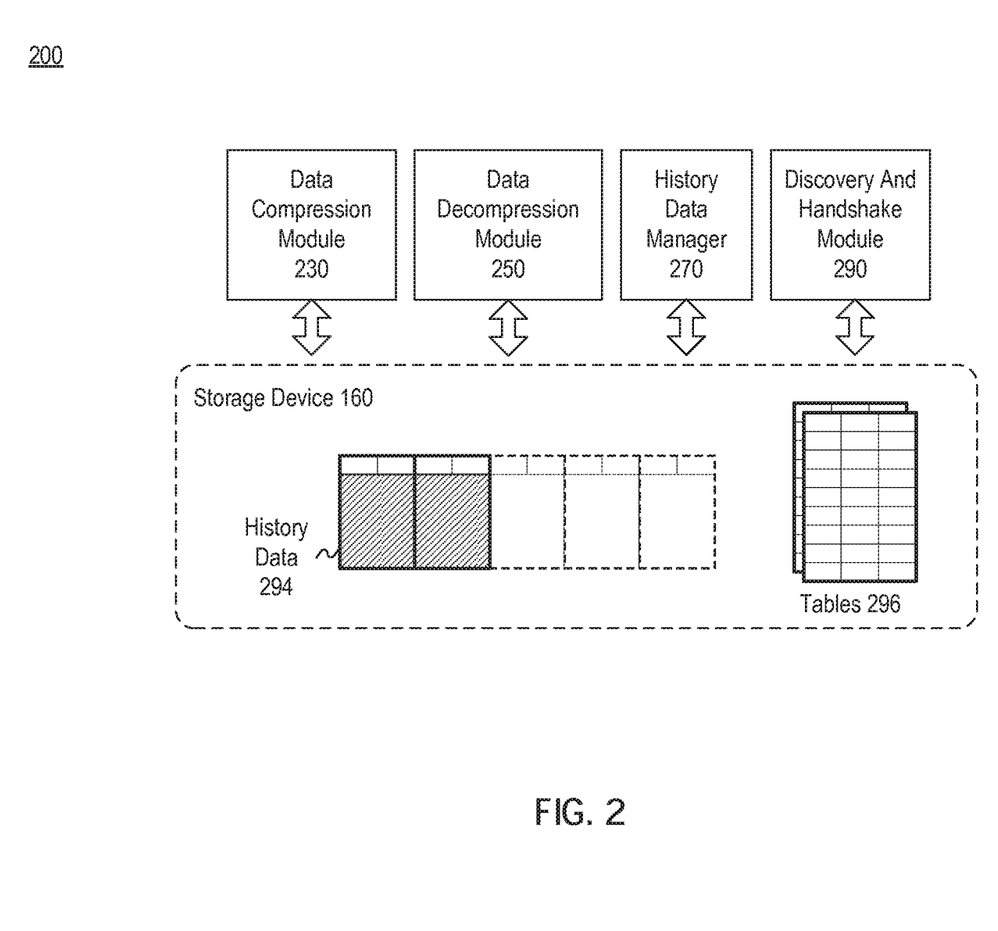
FIG. 2 is a block diagram depicting an exemplary system with which embodiments of the present disclosure can be implemented.

FIG. 2 is a block diagram depicting an exemplary system 200 with which embodiments of the present disclosure can be implemented. In some embodiments, system 200 can be implemented as system 110 of FIG. 1 and includes data compression module 230, data decompression module 250, history data manager 270, and discovery and handshake module 290, at least some of which, when executed by a processor (e.g. processor 112 of FIG. 1), can retrieve and/or update history data 294 and one or more tables 296 stored in storage device 160. Although FIG. 2 shows that system 200 includes both data compression module 230 and data decompression module 250, it is understood that system 200 can include only data compression module 230 to compress data, while a recipient system (e.g. system 140 in FIG. 1) can include only data decompression module 250 to receive the compressed data from system 200, and then decompress it. Moreover, although FIG. 2 shows that history data 294 and tables 296 are two separate entities, it is understood that both can be part of a data structure.

History data 294 includes data that is recently compressed and/or data that is recently generated as a result of decompressing other data, while tables 296 include information that can facilitate a search for a piece of data within history data 294. In some embodiments, history data 294 includes data which system 200 expects to be redundant for a particular transmission. For example, when system 200 receives an instruction to transmit data to the recipient system (e.g. system 140 in FIG. 1), it may expect that at least part of the data to be transmitted is already part of corresponding history data stored in system 140, hence rendering this part of the data redundant and obviating the need to transmit the redundant data. Using information from tables 296, system 200 can search for and locate the redundant data within history data 294. After locating the redundant data, and knowing that system 140 also stores the same redundant data, system 200 can then transmit, to system 140, information indicating a relationship between the redundant data and history data 294 (and/or the corresponding history data stored in system 140). Such a relationship can be, for example, a location and size of the redundant data in the corresponding history data stored in system 140. Such a relationship typically can be expressed with much less data than the redundant data itself. Therefore, the transmission of the relationship information, instead of the redundant data, can conserve the bandwidth of the medium (e.g., network 130 of FIG. 1) over which the transmission occurs. System 200 can also compress the information to further reduce the volume of data to be transmitted. Further details about history data 294 and tables 296 will be discussed below.

Data compression module 230 can receive raw data (e.g., from another application executed by processor 112 of FIG. 1) and an instruction to compress the raw data. Data compression module 230 can then look for the raw data in history data 294 using information from tables 296. Portions of history data 294 can be stored in the memory (e.g. memory device 114 of FIG. 1) and/or in storage device (e.g. storage device 116 of FIG. 1). If the data compression module 230 finds the raw data in history data 294, data compression module 230 can generate a reference token which includes information to assist the recipient system to find the same piece of raw data in its corresponding history data. The information included in the reference token can indicate a location within history data 294, as well as a length of the data which matches the raw data. The reference token can then be transmitted to the receiving system. On the other hand, if data compression module 230 cannot find the raw data in history data 294, the raw data will be transmitted as part of raw tokens to the receiving system. The raw tokens and reference tokens can then be used to form a token stream. In some embodiments, the input data can also be added to history data 294, and tables 296 can be updated with information for locating the added input data in the updated history data 294. In some embodiments, the token stream can be compressed using one or more lossless data stream compression algorithms, before being transmitted. In some embodiments, the token stream (compressed or not) can also be packetized via, for example, network interface 118 of FIG. 1, and the packetized token stream can then be transmitted over a network (e.g. network 130 of FIG. 1). Data compression module can also add the raw data to history data 294, and update tables 296 with the information for locating the added data in the updated history data 294.

Data decompression module 250 can reconstruct a data stream from the token stream transmitted by data compression module 230. After receiving and de-multiplexing the packetized data to retrieve the data packets containing reference and/or raw tokens (and decompressing the de-multiplexed data if the data is compressed) to obtain the token stream, data decompression module 250 can identify the reference tokens and/or raw tokens from the token stream. With each identified reference token, data decompression module 250 can retrieve the data associated with the reference token from history data 294 based on the location and length information of the reference token, and add the retrieved data to an output data stream meant for, for example, another application executed on processors 112. For the raw tokens, data decompression module 250 can add the raw data included in the raw tokens into the output data stream. Data decompression module 250 can also update history data 294 to include the output data stream, and update tables 296 with the information for locating the added data in the updated history data 294.

Exemplary embodiments for methods and systems of compression and decompression of data containing redundancies are described in U.S. Provisional Patent Application No. 61/913,295, titled Method and Apparatus for Data Compression, filed on Dec. 7, 2013, and in co-pending U.S. Non-provisional patent application Ser. No. 14/559,816, titled System and Method for Compression and Decompression of Data Containing Redundancies, filed on Dec. 3, 2014, the entire content of both of which are incorporated herein by reference for all purposes.

History data manager 270 manages the creation and deletion of history data 294, on top of the updating by data compression module 230 and data decompression module 250. For example, history data manager 270 can delete some of the history data 294 which is old to make room for new history data. History data manager 270 can also synchronize with the recipient system, or other system from which system 200 receives data, about the changes in the history data, so that both sides involved in the transmission of the token streams have the same history data. Exemplary embodiments for methods and systems of compression history data synchronization and management are described in U.S. Provisional Patent Application No. 61/926,145, titled Method and Apparatus for Compression History Data Synchronization, filed on Jan. 10, 2014, and in co-pending U.S. Non-provisional patent application Ser. No. 14/591,750, titled System and Method for Synchronizing History Data For Compression and Decompression, filed on Jan. 8, 2015, the entire content of both of which are incorporated herein by reference for all purposes.

Discovery and handshake module 290 can determine whether a communication peer supports the methods of compression and/or decompression consistent with embodiments of the present disclosure. The determination may include, for example, whether the peer includes a data compression module 230 and/or data decompression module 250 and is capable of processing (and/or transmitting) reference tokens and raw tokens according to embodiments of the present disclosure.

Figure 3A:
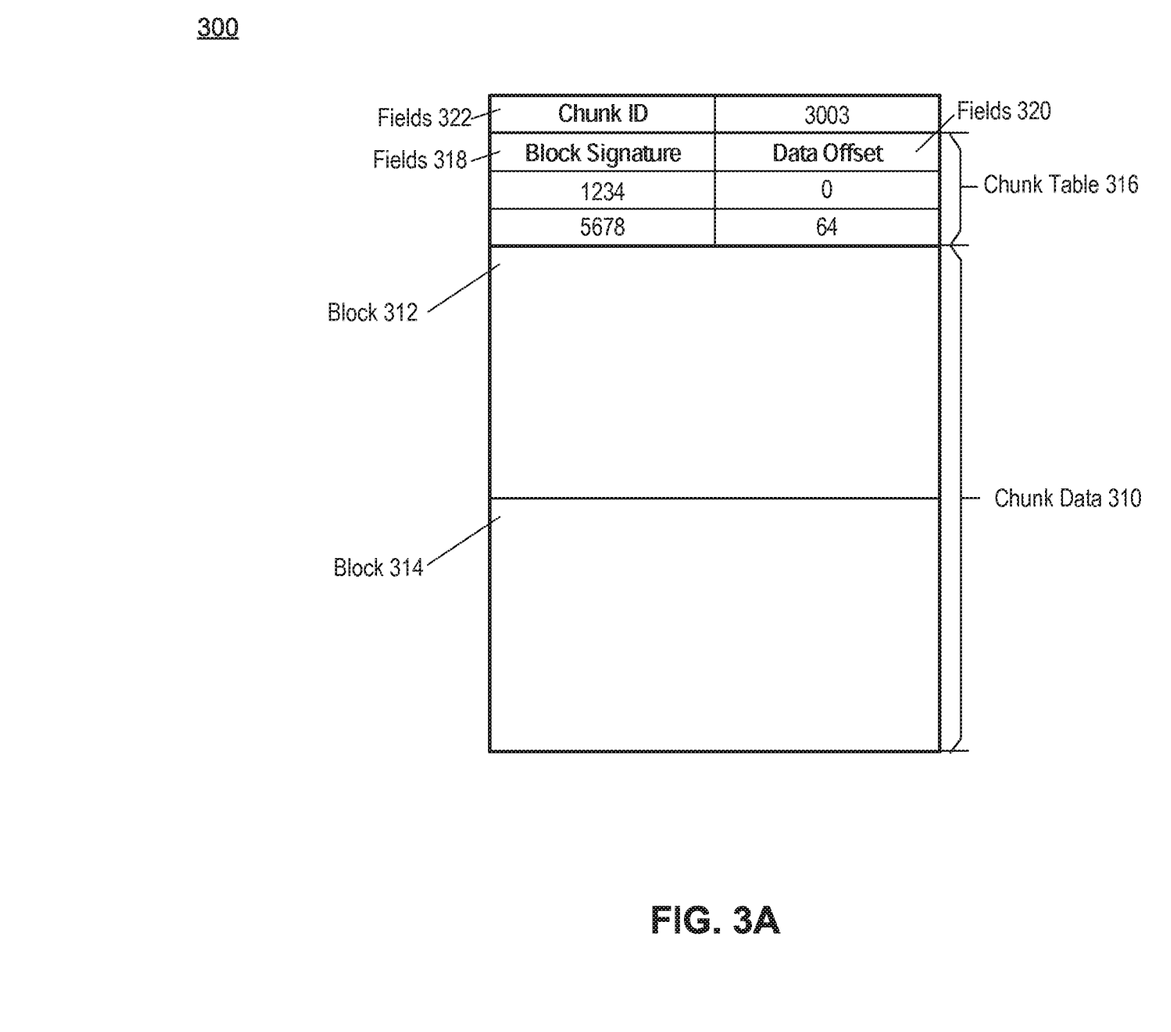
FIGS. 3A-3C are block diagrams illustrating exemplary data structures for facilitating searching of history data according to embodiments of the present disclosure.

FIG. 3A is a block diagram illustrating an exemplary data chunk structure 300 for facilitating searching of history data according to embodiments of the present disclosure. In some embodiments, history data (e.g. history data 294 of FIG. 2) can be organized into one or more data chunks, each data chunk being represented by a data chunk structure 300. A data chunk structure 300 can be stored in either a memory (e.g. memory 114 of FIG. 1), and/or in a storage device (e.g. storage device 116 of FIG. 1). As to be discussed later, a data chunk structure can be swapped out of memory into a storage device, or vice versa. Each data chunk structure 300 includes chunk data 310, which can include one or more data blocks 312 and 314. A block can refer to a unit of data size adopted by all devices supporting the methods of compression and/or decompression consistent with embodiments of the present disclosure. For example, a block size can be of 64 byte. The block size can be any number.

Data chunk structure 300 is also associated with a chunk table 316. Although FIG. 3A shows that chunk table 316 is part of data chunk structure 300 and next to data blocks 312 and 314, it is understood that chunk table 316 needs not be stored in the same location as the data blocks. In some embodiments, chunk table 316 can be part of tables 296 of FIG. 2 and include information for locating a piece of data within data chunk structure 300. Such information can include an identifier used to identify the piece of data, and the location of the data within data chunk structure 300. As shown in FIG. 3A, chunk table 316 includes fields 318 to store a block signature, which is generated to represent the content of a particular block of data. For example, a block signature of "1234" is associated with data block 312. Besides, a block signature of "5678" is associated with data block 314. Further details about the generation of block signatures will be discussed below.

Chunk table 316 also includes fields 320 to store a data offset, in bytes, which is associated with the location of the particular blocks of data within data chunk structure 300. Since data block 312 is the first data block within data chunk structure 300, the data offset associated with data block 312 can be 0. Data block 314 is stored next to data block 312 within the data chunk structure. In this particular example, the size of data block 312 is 64 bytes, therefore the data offset associated with data block 314 is 64 (bytes). Data chunk structure 300 further includes fields 322 which can be used to associate a particular data chunk structure 300 with a chunk identifier (ID). The chunk ID is identical across systems which store the same data chunk for the history data, and uniquely identifies the data chunk. Based on a known block signature, a piece of data can be efficiently located (or determined to be absent) within a particular data chunk structure, by looking for one or more block signatures that match the known signature. Although not shown in FIG. 3A, each data chunk structure 300 can also be associated with a timestamp, and a search can start on a data chunk structure, designated as the working history data chunk, which is most recently updated.

Figure 3B:
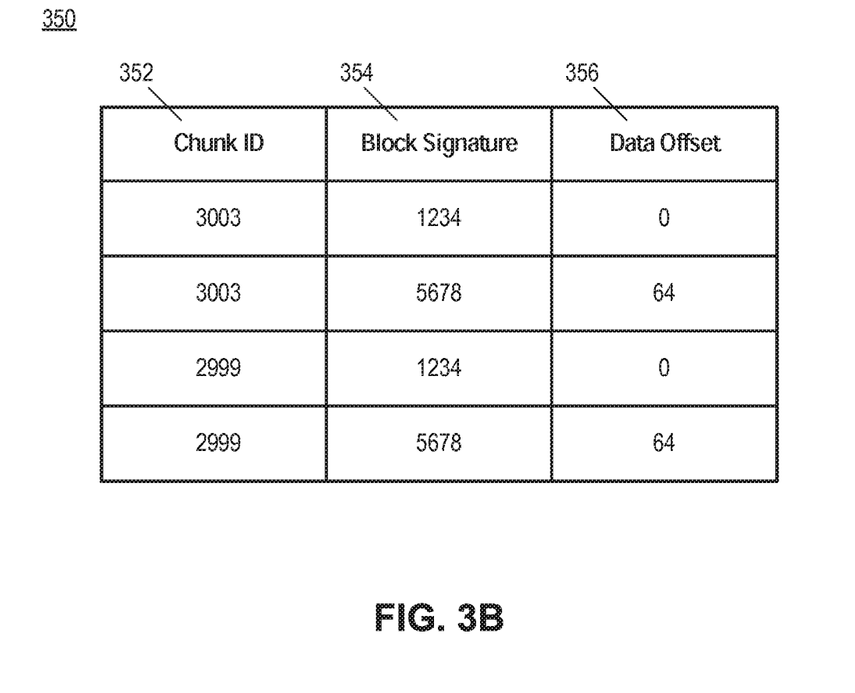

FIG. 3B is a block diagram illustrating an exemplary memory chunk table 350 for facilitating searching of history data according to embodiments of the present disclosure. Memory chunk table 350 can facilitate a search for a piece of data among each of the history data chunks (e.g. as stored according to data chunk structure 300 of FIG. 3A) currently stored in a volatile memory (e.g. memory 114 of FIG. 1). As shown in FIG. 3B memory chunk table 350 includes fields 352 to store chunk IDs where each chunk ID identify a data chunk structure in the memory. For each data chunk structure identified by fields 352, memory chunk table 350 further includes fields 354 and 356 to associate, respectively, a block signature that represent a particular data block, and the location of that data block, within the data chunk structure. Based on a known signature, a piece of input data can be efficiently located (or determined to be absent) among a set of data chunk structures stored in a memory, by looking for one or more block signatures that matches the known signature. If the input data is located in a particular data chunk structure, the chunk ID associated with that particular data chunk structure and the location of the data within that data chunk structure can be retrieved. In some embodiments, the retrieved chunk ID and location information can be used for a second, and more refined, search, as to be discussed in detail below. Whether or not such a second search is needed depends on how the block signature is calculated—if the block signature cannot uniquely identify the data (i.e. different data values can generate the same block signature), a second search may be needed to ensure that the data blocks located within that data chunk structure are truly identical to the input data, such that a reference token generated henceforth accurately represents the input data.

Figure 3C:
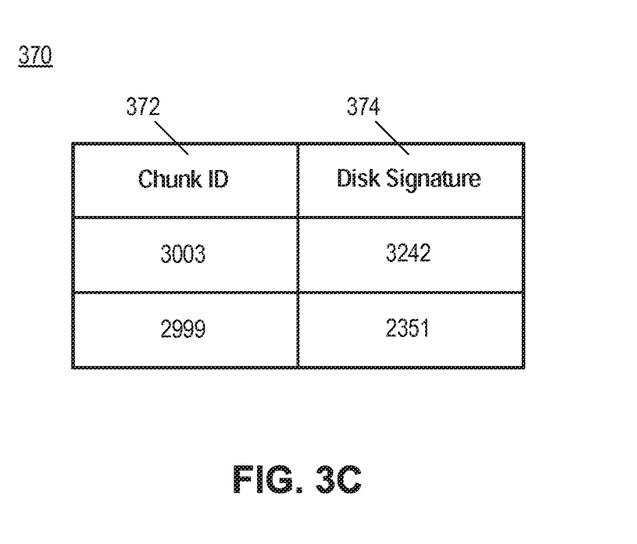

FIG. 3C is a block diagram illustrating an exemplary disk chunk table 370 for facilitating searching of history data according to embodiments of the present disclosure. Disk chunk table 370 can facilitate a search for a piece of data among each of the history data chunks (e.g. as stored according to data chunk structure 300 of FIG. 3A) currently stored in a non-volatile storage device (e.g. storage device 116 of FIG. 1). As shown in FIG. 3C, disk chunk table 370 includes fields 372 to store chunk ID, where each chunk ID identify a data chunk structure representing a chunk of data in the storage device. For each data chunk structure identified by fields 372, disk chunk table 370 further includes fields 374 to store a disk signature, which is generated to represent the content of multiple data blocks stored in the storage device.

In some embodiments, tables 316, 350 and 370 provide a hierarchical structure for search of history data organized as data chunk structures 300 (hereinafter "history data chunks"). To locate a piece of data in the history data, the search can start with the most recent history data chunk currently that is loaded into the memory (designated as the working history data chunk), by looking up for one or more blocks with block signatures matching with the signatures of the data, based on table 316 associated with the working history data chunk. If the data cannot be found, the scope of the search can then be expanded to every history data chunk currently being loaded into the memory, based on the information from table 350. It can be desirable to first confine the search within the memory for a few reasons. First, it is more likely that the data stored in the memory includes the latest update (e.g., with data added as a result of compression or decompression), and therefore the likelihood of finding the piece of data can become higher. Second, accessing data from the memory is also typically faster than accessing data from the storage device, which speeds up the search. Therefore, the search can start with the history data chunks currently stored in the memory.

If the piece of data cannot be located in the memory, the search can then be performed at the history data chunks stored in the storage device with information from table 370. If a match is found based on the disk signature, the history data chunk with a chunk ID associated with the matching disk signature can be loaded into the memory, and a more refined search based on block signatures can then be conducted on newly-loaded history data chunk using information from the associated table 316.

Figure 4A:
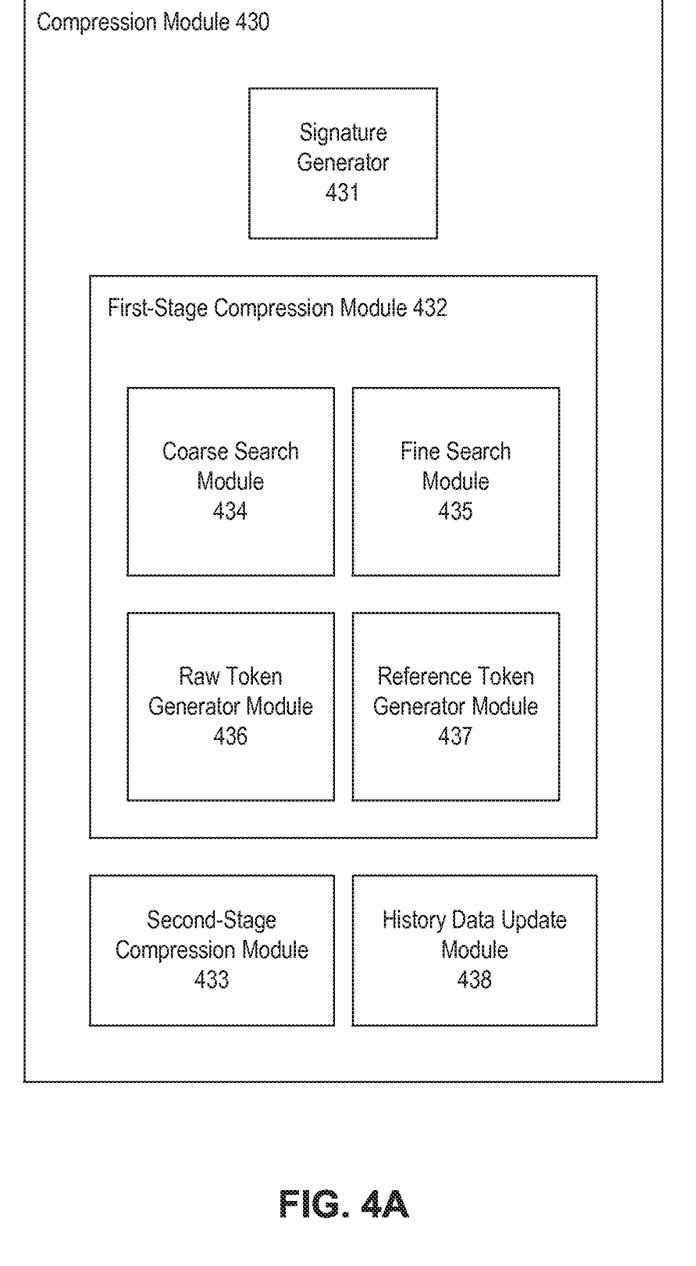
FIG. 4A is a block diagram illustrating an exemplary compression module according to embodiments of the present disclosure.

FIG. 4A is a block diagram illustrating an exemplary compression module 430 according to embodiments of the present disclosure. In some embodiments, compression module 430 provides functionalities similar to those of data compression module 230 of FIG. 2. Compression module 430 includes a signature generator 431, a first-stage compression module 432 and a second-stage compression module 433. First-stage compression module 432 further comprises a coarse search module 434, a fine search module 435, a raw token generator module 436, and a reference token generator module 437.

As compression module 430 receives input data, the data can be processed by signature generator 431 to generate one or more block signatures, where a block signature is associated with each consecutive data block with size of, for example, 64 bytes. Further details about the generation of block signatures will be discussed below.

After at least a block signature is generated for the input data, the generated block signature and the input data can be passed to coarse search module 434 of first-stage compression module 432. Based on the generated block signature, the coarse search module can search for a matching block signature at a particular history data chunk (for example, the working history data chunk) based on, for example, information from the chunk table 316 associated with the working history data chunk. In some embodiments, coarse search module can perform a hierarchical search of the history data chunks stored in the memory and in the storage device using information from, for example, tables 316, 350, and 370 of FIGS. 3A-3C. If a match is found, which may indicate a high likelihood that an exact copy of the input data (or portion thereof) can be found in the working history data chunk, the input data and the data offset associated with the data block with the matching block signature, within the working history data chunk, can then be passed to fine search module 435.

At fine search module 435, a more precise search for the input data within the working history data chunk can be carried out. In some embodiments, such a search may be conducted to ensure that the data blocks located within that working history data chunk are truly identical to the input data. Based on the data offset, fine search module 435 can read the data block, and carry out an exact byte-string comparison against the input data, to make sure that the input data matches exactly with the data block. Fine search module 435 can also expand the scope of comparison in both forward and backward directions, by reading data blocks (or portions thereof) from the working history data chunk in front of and behind the location indicated by the data offset, in order to maximize the number of data blocks that match with a portion of the input data of the same size. After locating the maximum number of matching data blocks within the working history data chunk, the corresponding portion of the input data can be represented by a reference token which indicates the location and the number of matching data block (or a length of the matching data as part of the data blocks) within the history data chunk. In some embodiments, the reference token also includes the chunk ID associated with the working history data chunk. The reference token can be generated by reference token generator module 437 and added to a token stream representing the input data.

On the other hand, for the portion of the input data where either coarse search module 434 fails to find a matching block signature, or fine search module 435 fails to find a piece of data that matches exactly that portion of the input data despite the fact that a matching block signature was found, such a portion of the input data will then be represented by raw tokens. In some embodiments, raw tokens include a copy of that portion of input data. The raw token can be generated by raw token generator module 436 and added to the token stream representing the input data. In some embodiments, compression module 430 further includes a history data update module 438, which adds the input data to the history data accessible by compression module 430, and updates at least one of memory chunk table 350 and disk chunk table 370 with the block and/or disk signatures generated for the input data.

After first-stage compression module 432 generates at least one token for the token stream, the generated token stream can then be passed to second-stage compression module 433 to further compress the token stream. In some embodiments, second-stage compression module 433 can employ a lossless data stream compression algorithm to carry out the compression. The compressed token stream can then be used to represent the input data in a compressed state.

Figure 4B:
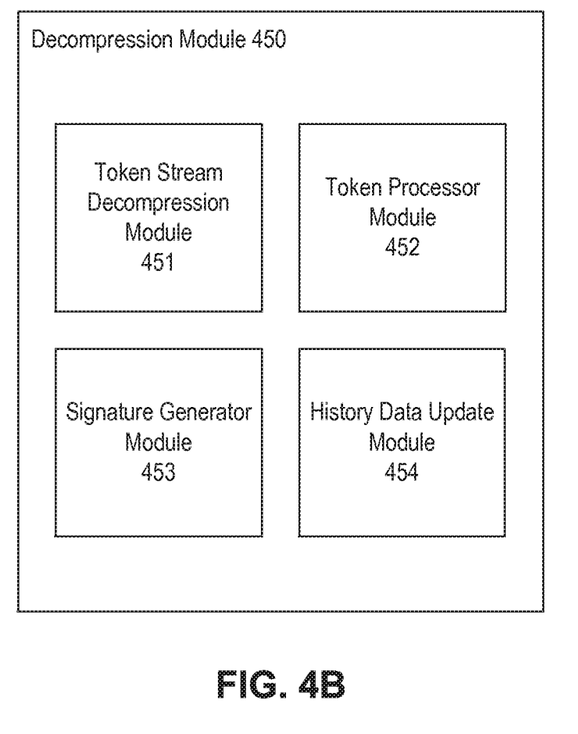
FIG. 4B is a block diagram illustrating an exemplary decompression module according to embodiments of the present disclosure.

FIG. 4B is a block diagram illustrating an exemplary decompression module 450 according to embodiments of the present disclosure. In some embodiments, decompression module 450 provides functionalities similar to those of data decompression module 250 of FIG. 2. Decompression module 450 includes a token stream decompression module 451, a token processor module 452, a signature generator module 453, and a history data update module 454. Token stream decompression module 451 can receive a compressed token stream from, for example, compression module 430, and perform decompression according to the compression algorithm employed by second-stage compression module 433 of compression module 430, to recover the token stream. The recovered token stream can then be processed by token processor module 452, which can identify one or more reference tokens and/or raw tokens from the token stream. With reference tokens, token processor module 452 can locate a working history data chunk (e.g. the chunk that is most recently updated, or a chunk identified by the chunk ID information transmitted as part of the reference token) from the history data accessible by decompression module 450 and, based on the location information and size of matching data information included in the reference tokens, extract the portion of history data represented by the reference tokens. Token processor module 452 can also retrieve the portion of input data (provided to compression module 430) included in the raw tokens. Based on the token stream, token processor module 452 can then reconstruct a data stream that is identical to the input data. The reconstructed data stream can then be passed to signature generator module 453, which generates block and/or disk signatures for the reconstructed data stream. History data update module 454 can also add the reconstructed data stream to the history data accessible by the decompression module 450, so that it matches with the history data accessible by compression module 430, and updates at least one of memory chunk table 350 and disk chunk table 370 with the block and/or disk signatures generated for the reconstructed data.

Figure 5A:
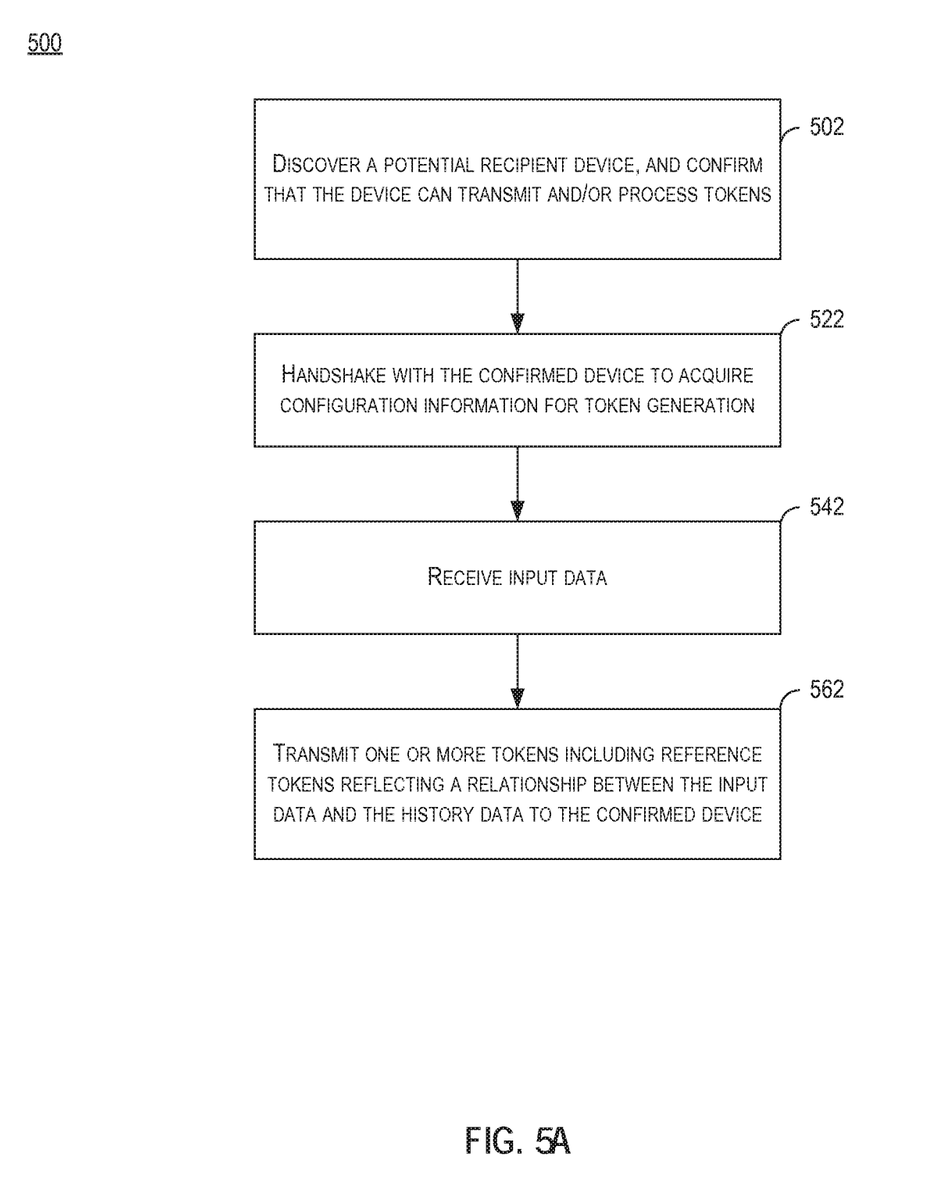
FIGS. 5A-5B are flowcharts illustrating exemplary methods of discovering, confirming and handshaking with a device for transmitting compression data according to embodiments of the present disclosure.

FIG. 5A is a flowchart illustrating an exemplary method 500 of discovering, confirming and handshaking with a device for transmitting and/or receiving compression data according to embodiments of the present disclosure. The compression data can include raw tokens and reference tokens generated by, for example, compression module 430 of FIG. 4A. In some embodiments, method 500 can be implemented by, for example, discovery and handshake module 290 of FIG. 2 operating on an electronic device (e.g., computer system 110 of FIG. 1). While the following flowcharts disclose steps in a particular order, it will be appreciated that at least some of the steps can be moved, modified, or deleted where appropriate, consistent with the teachings of the present disclosure. And while the steps are indicated as being performed by an electronic device, it is appreciated that the steps can be performed by more than one electronic device.

In step 502, the electronic device (e.g., a data compression device) discovers a potential recipient device (e.g., a data decompression device), and confirms that the potential recipient device can receive and process the raw tokens and reference tokens to be transmitted by the electronic device, before initiating a transmission of the raw tokens and reference tokens. There can be various reasons why it is desirable to confirm with a potential recipient device first before initiating the transmission. For example, the generation of the raw and reference tokens can take up precious computing resources (e.g., allocation of memory and disk space for new data chunks to store uncompressed raw data), and the transmission of raw and reference tokens can also take up precious network resources. Therefore it is desirable to confirm that the recipient device can receive and process the raw and reference tokens (e.g., if the recipient device includes the decompression module 450 of FIG. 4B), before committing resources to generating and transmitting the tokens.

Figure 5B:
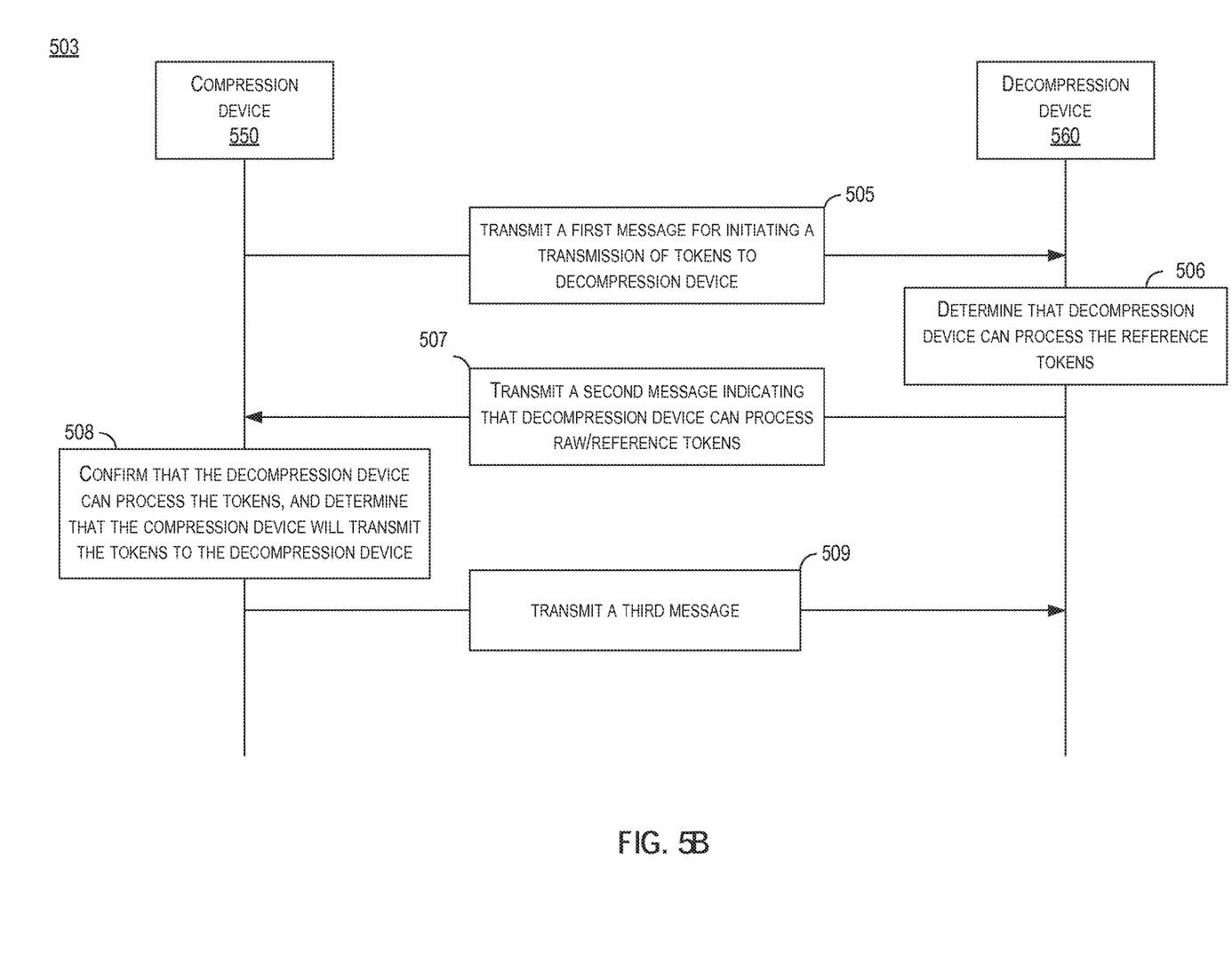

Step 502 may include a number of sub-steps. Reference is now made to FIG. 5B, which illustrates an exemplary method 503 which can be part of step 502 of FIG. 5A. First, in step 505, a compression device 550 (e.g., an electronic device on which discovery and handshake module 290 is operating) transmits a first message for initiating a transmission of tokens (raw tokens and/or reference tokens) to a decompression device 560 (e.g., another electronic device on which discovery and handshake module 290 is operating). In some embodiments, the first message includes a first indicator configured to indicate that the compression device is to transmit the tokens. The first indicator (or other parts of the first message) may also convey other information related to the transmission and generation of the tokens. As an illustrative example, compression device 550 may not include the second stage compression module 433 of FIG. 4A. The first indicator may then indicate, when a reference token is transmitted by the compression device, whether the reference token has been further compressed with, for example, a lossless data stream compression algorithm by second stage compression module 433. If the first indicator indicates that the compression device does not use second stage compression module 433 to further compress the reference token, decompression device 560 can then, when processing the received reference tokens, decide to bypass token stream decompression module 451, or at least instruct module 451 not to attempt to decompress the received tokens according to the lossless stream compression algorithm.

In response to receiving the first indicator, decompression device 560 can determine that it can receive and process the tokens to be transmitted by the compression device, in step 506. The determination can be made based on various factors. As an illustrative example, decompression device 560 may have parts of decompression module 450 disabled and cannot process the tokens generated from compression module 430 operating on the compression device. The decompression device may also determine, for example, whether it has sufficient memory and/or disk space to allocate new data chunks to store the uncompressed data included in the raw tokens, and/or whether it has sufficient computing power to process the tokens. After the decompression device determines that it can process the tokens, the decompression device then transmits a second message including a second indicator configured to indicate that it can process the tokens to be transmitted by the compression device, in step 507.

In some embodiments, the first and the second indicators can be represented by one or more numbers included respectively in the first and the second messages. Different numbers can be used to represent different information (e.g., a compression device indicating that it is attempting to initiate a transmission of tokens, or a decompression device indicating that it is capable of processing the tokens, etc.), and the recipient of the messages can then determine the meaning of the received indicators based on their values. In some embodiments, the mapping between the indicators and the information they present are known only to a group of devices (e.g., devices with compression module 430 of FIG. 4A and/or decompression module 450 of FIG. 4B). Such an arrangement can help reduce the likelihood that, for example, an impersonating device faking as a decompression device intercepts the first message and responds with the second message to deceive the compression device into transmitting the tokens. Although numbers are being discussed herein, it is understood that the first and second indicators can be implemented with any combination of numbers, symbols, and/or alphabets.

After the compression device receives the second message, it confirms that the decompression device can process the tokens, and determines that the compression device will transmit the tokens to the decompression devices, in step 508. The compression device can make the confirmation based on whether the second message includes the second identifier signaling that the decompression device can receive and process the tokens. The compression device may also determine whether it has sufficient memory and/or disk space to allocate new data chunks to store the uncompressed data as part of the new history data before transmitting the data as raw tokens. The compression device can then transmit a third message to the decompression device, to acknowledge the reception of the second message from the decompression device, and to indicate the compression methods finally selected (e.g., whether second-stage compression module 433 is used to further compress the tokens), in step 509. After receiving the third message and/or the tokens, the decompression can then allocate resources to process the tokens (not shown in FIG. 5B).

In some embodiments, the transmission and reception of the tokens can be performed under the Transmission Control Protocol/Internet Protocol (TCP/IP), the first message can be a SYN packet, the second message can be a SYN+ACK packet, and the third message can be a first data packet configured to confirm the discovery and handshake, and a three-way TCP handshake is carried out (e.g. receiving the first data packet) before the decompression device allocates resources to process the tokens. In some embodiments, each of these packets includes an Internet Protocol version 4 (1Pv4) or Internet Protocol version 6 (1Pv6) header, and a TCP header. The definition of 1Pv4 header is described in, for example, Request For Comments (RFC) 791 issued by Internet Engineering Task Force (IETF) in September 1981, the content of which is hereby incorporated by reference. The definition of TCP header is described in, for example, RFC 793 issued by IETF in September 1981, the content of which is hereby incorporated by reference.

Figure 6A:
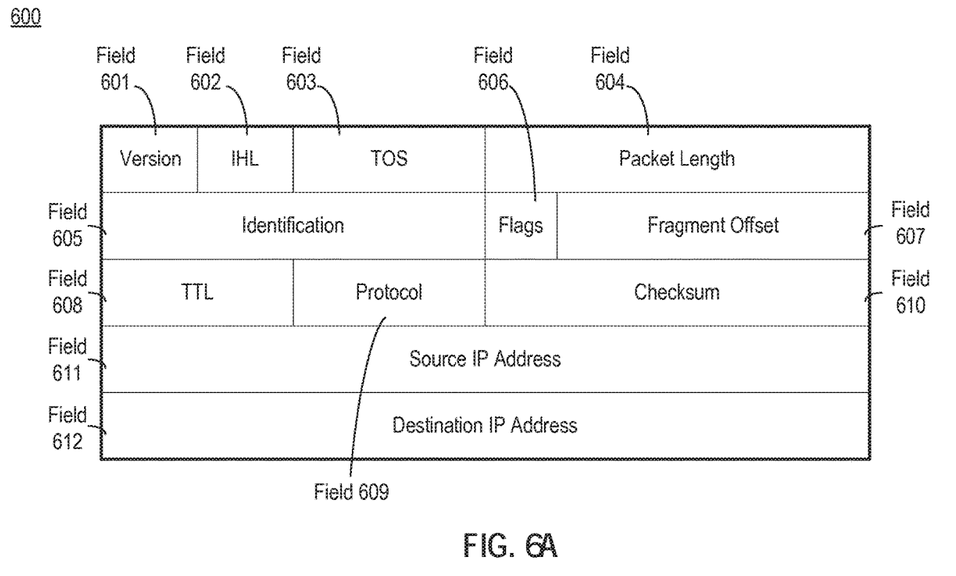
FIGS. 6A-6B are block diagrams illustrating exemplary 1Pv4 and TCP headers for transmitting compression data according to embodiments of the present disclosure.
Figure 6B:
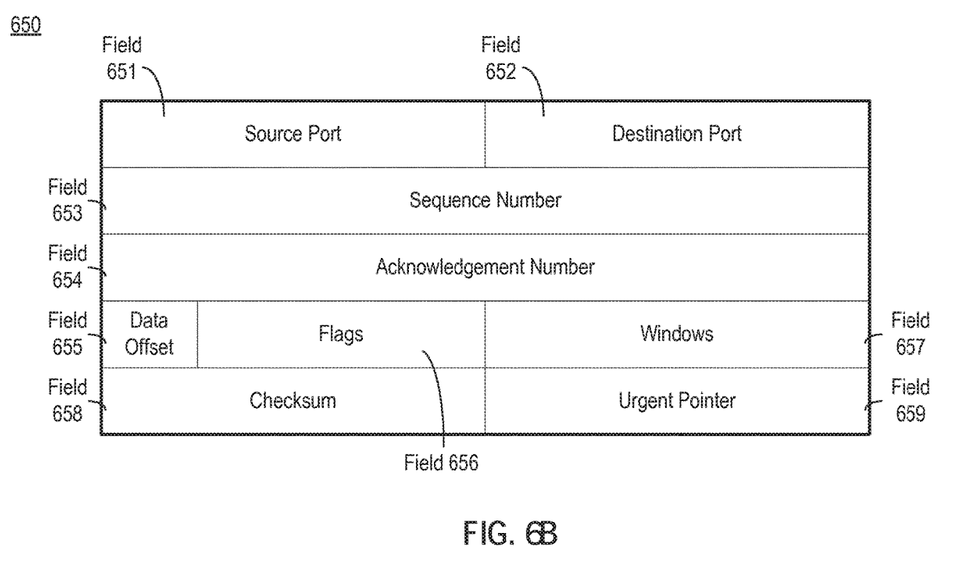

Reference is now made to FIGS. 6A and 6B, which are block diagrams illustrating an exemplary IPv4 header 600 and an exemplary TCP header 650 for transmitting compression data according to embodiments of the present disclosure. As shown in FIG. 6A, 1Pv4 header 600 includes a Version field 601, an Internet Header Length (IHL) field 602, a Type Of Service (TOS) field 603, a Packet Length field 604, an Identification field 605, a Flags field 606, a Fragment Offset field 607, a Time To Live (TTL) field 608, a Protocol field 609, a Checksum field 610, a Source IP Address field 611, and a Destination IP Address field 612. Moreover, as shown in FIG. 6B, TCP header 650 includes a Source Port field 651, a Destination Port field 652, a Sequence Number field 653, an Acknowledgment Number field 654, a Data Offset field 655, a Flags field 656, a Windows field 657, a Checksum field 658, and an Urgent Pointer field 659. Window field 657 can be used to store a number which indicates the amount of data a recipient device can receive in a TCP transmission, and is typically set at a relatively large number to avoid affecting the throughput of the recipient device in receiving the data. In some embodiments, the number stored in Window field 657 can be made a prime number or an odd number. In some embodiments, the number stored in Window field 657 can be further encoded to convey other information for the token transmission (e.g., to indicate whether the compression device is using second-stage compression module 433 to further compress the reference tokens, or just using first-stage compression module 432 to generate the tokens).

In some embodiments, the compression device can use a combination of the values stored in Identification field 605 of IPv4 header 600 and the values stored in Windows field 657 of TCP header 650 to implement the aforementioned first and second indicators. Such an arrangement can be desirable for various reasons. For example, these values are rarely changed by the network devices en route, so they can be easily verified by the recipient device, and the likelihood of coincident collision with other TCP/IP transmissions that are not related to the transmission of the tokens can be reduced as well. In some embodiments, different values for the Window field can be used by SYN and SYN+ACK packets for, respectively, the first and second indicators, to reduce the likelihood that a rogue TCP proxy can impersonate a decompression device by simply replying with a SYN+ACK packet with the Window field value copied from that of the SYN packet transmitted by the compression device. Such an arrangement can avoid subjecting the compression device to a denial-of-service attack by the rogue TCP proxy (e.g., the TCP proxy causes the compression device to allocate computing resources by sending fake second messages).

Referring back to FIG. 5A, after the electronic device discovers a potential recipient device and confirms with the device that it can receive and process the tokens in step 502, the electronic device can then execute step 522 to handshake with the confirmed device in step 522. The handshaking is for both devices to exchange, with each other, configuration information for token generation (for a compression device) and for token processing (for a decompression device). The two devices can also exchange with each other a second identifier that is configured to uniquely identify each device. In some embodiments, the second identifier can be used to determine what numbers to be used for chunk IDs. For example, if a compression device finds that its second identifier has a smaller value than that of the confirmed decompression device, it may use only odd numbers for the chunk IDs. Moreover, the two devices can also exchange information about a range of numbers that are available to be assigned as chunk IDs. Such an arrangement can improve the likelihood that both devices have access to the same set of data chunks, that both devices use an identical set of chunk IDs to refer to the identical data chunks, and that both devices allocate chunk IDs for newly-created data chunks from an identical set of numbers. In some embodiments, the handshaking information is transmitted and received as TCP packets.

After handshaking with the confirmed device to acquire the configuration information for token generation in step 522, the electronic device can execute step 542 to receive input data, and then execute step 562 to transmit the tokens, wherein the tokens include reference tokens reflecting a relationship between the input data and the history data (e.g., a location and a size of identical data in a data chunk identified by a chunk ID), to the confirmed device.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed:

1. An apparatus, comprising:
    a memory device that stores history data; and
    at least one processor configured to:
        generate one or more first signatures based on the history data, the one or more first signatures representing content of one or more portions of the history data;
        transmit a first message to a recipient device to initiate a transmission and reception of one or more tokens;
        acquire a second message, from the recipient device, to confirm that the recipient device is capable of processing and transmitting the one or more tokens;
        responsive to a confirmation that the recipient device is capable of processing and transmitting the one or more tokens, acquire configuration information from the recipient device for generating the one or more tokens;
        receive input data;
        generate one or more second signatures based on the input data, the one or more second signatures representing content of one or more portions of the input data;
        identify one or more data chunks in the history data;
        locate a part of the input data that is redundant in the history data by searching among the one or more data chunks in the history data;
        generate the one or more tokens reflecting a relationship between the part of the input data and the history data, wherein each of the one or more tokens indicates a location of a respective one of the portions of the history data that matches a respective one of the portions of the input data, and wherein generating the one or more tokens comprises determining whether one of the first signatures matches one of the second signatures; and
        transmit the one or more tokens to the recipient device.

2. The apparatus of claim 1, wherein the at least one processor is further configured to:
    responsive to receiving the second message, determine whether resources can be allocated, at the apparatus, for the transmission of the one or more tokens; and
    responsive to determining that resources can be allocated at the apparatus, transmit the one or more tokens.

3. The apparatus of claim 1, wherein the first message includes a first indicator configured to indicate that the apparatus is configured to transmit the one or more tokens.

4. The apparatus of claim 3, wherein the first indicator is further configured to reflect the relationship between the input data and the history data reflected in the reference tokens to be transmitted.

5. The apparatus of claim 3, wherein the second message includes a second indicator to indicate that the recipient device is capable of processing the one or more tokens.

6. The apparatus of claim 1, wherein the configuration information includes a first identifier configured to uniquely identify the recipient device.

7. The apparatus of claim 6, wherein the configuration information includes first information used for generation of one or more second identifiers configured to identify one or more of the portions of the history data, wherein the second identifiers are included in the one or more tokens to express the relationship between the one or more tokens and the history data.

8. The apparatus of claim 1, wherein the first message and the second message are respectively transmitted and received under the Transmission Control Protocol/Internet Protocol (TCP/IP), wherein the first message is a SYN packet, and wherein the second message is a SYN+ACK packet.

9. The apparatus of claim 8, wherein the first message includes a TCP header and an IP header, wherein the IP header includes an identification field and the TCP header includes a window field, wherein the identification field stores a first value and the window field stores a second value, and wherein a combination of the first and second values are configured to indicate that the apparatus is configured to transmit and process the tokens.

10. The apparatus of claim 7, wherein the configuration information is transmitted as one or more TCP packets.

11. A computer-implemented method of processing data, the method comprising:
    receiving history data from a memory device;
    generating one or more first signatures based on the history data, the one or more first signatures representing content of one or more portions of the history data;
    transmitting a first message to a recipient device to initiate a transmission and reception of one or more tokens;
    acquiring a second message, from the recipient device, to confirm that the recipient device is capable of processing and transmitting the one or more tokens;
    responsive to confirming that the recipient device is capable of processing and transmitting the one or more tokens, acquiring configuration information from the recipient device for generating the one or more tokens;

receiving input data;

generating one or more second signatures based on the input data, the one or more second signatures representing content of one or more portions of the input data;

identifying one or more data chunks in the history data;

locating a part of the input data that is redundant in the history data by searching among the one or more data chunks in the history data;

generating one or more tokens reflecting a relationship between the part of the input data and the history data, wherein each of the one or more tokens indicates a location of a respective one of the portions of the history data that matches a respective one of the portions of the input data, and wherein generating the one or more tokens comprises determining whether one of the first signatures matches one of the second signatures; and transmitting the one or more tokens to the recipient device.

12. The method of claim 11, further comprising:

responsive to receiving the second message, determining whether resources can be allocated for the transmission of the one or more tokens; and responsive to determining that resources can be allocated, transmitting the one or more tokens.

13. The method of claim 11, wherein the first message includes a first indicator configured to indicate the one or more tokens are to be transmitted.

14. The method of claim 13, wherein the first indicator is further configured to reflect the relationship between the input data and the history data reflected in the reference tokens to be transmitted.

15. The method of claim 13, wherein the second message includes a second indicator to indicate that the recipient device is capable of processing the one or more tokens.

16. The method of claim 11, wherein the configuration information includes a first identifier configured to uniquely identify the recipient device.

17. The method of claim 16, wherein the configuration information includes first information used for generation of one or more second identifiers configured to identify one or more of the portions of the history data, wherein the second identifiers are included in the one or more tokens to express the relationship between the one or more tokens and the history data.

18. The method of claim 11, wherein the first message and the second message are respectively transmitted and received under the Transmission Control Protocol/Internet Protocol (TCP/IP), wherein the first message is a SYN packet, and wherein the second message is a SYN+ACK packet.

19. The method of claim 18, wherein the first message includes a TCP header and an IP header, wherein the IP header includes an identification field and the TCP header includes a window field, wherein the identification field stores a first value and the window field stores a second value, and wherein a combination of the first and second values is configured to indicate that the tokens are to be transmitted and processed.

20. The method of claim 17, wherein the configuration information is transmitted as one or more TCP packets.

* * * * *